Nov. 18, 1969  J. ZEMANEK, JR  3,478,839
ORIENTATION SENSING SYSTEM FOR WELL LOGGING TOOL FOR USE
IN DEVIATED BOREHOLES
Filed Oct. 11, 1968  6 Sheets-Sheet 6

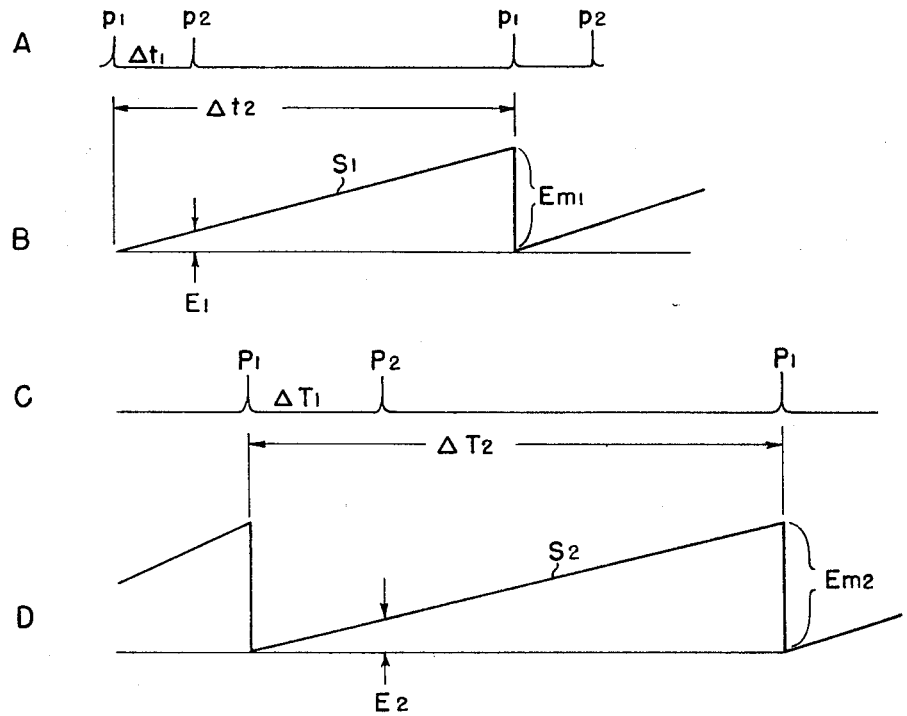
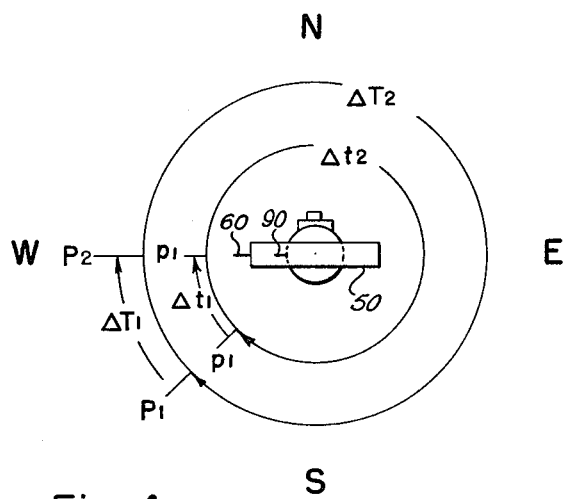
Fig. 3
Fig. 4

INVENTOR.
Joseph Zemanek, Jr.
BY
Arthur F. Zobal
ATTORNEY

United States Patent Office 3,478,839
Patented Nov. 18, 1969

3,478,839
ORIENTATION SENSING SYSTEM FOR WELL LOGGING TOOL FOR USE IN DEVIATED BOREHOLES
Joseph Zemanek, Jr., Dallas, Tex., assignor to Mobil Oil Corporation, a corporation of New York
Filed Oct. 11, 1968, Ser. No. 766,892
Int. Cl. G10k 11/00; G01v 1/40
U.S. Cl. 181—.5                    15 Claims

ABSTRACT OF THE DISCLOSURE

The specification discloses a directional acoustic transducer supported for rotation in a borehole tool and operated periodically to transmit acoustic pulses to the borehole wall and to detect reflected acoustic energy. In one embodiment, there is disclosed a gimbal-mounted magnetic north sensing device rotated independently of the acoustic transducer. Reference signals are generated each time the magnetic sensing device and the transducers are rotated past known points on the tool. In addition, a directional signal is generated each time the magnetic sensing device rotates past a known geographic orientation. These signals are employed to produce an orienting signal each time the transducer is rotated to magnetic north.

BACKGROUND OF THE INVENTION

This invention relates to an orientation sensing system for use in deviated wells for producing an orienting signal each time an exploratory sensing means, employed in a borehole logging tool, is rotated past a predetermined geographic orientation.

In U.S. Patent No. 3,369,626 there is disclosed an acoustic bore hole logging system wherein the walls of a borehole are scanned periodically with acoustic energy for obtaining information of interest. In one embodiment, a single transducer which acts both as a transmitter and a receiver is rotated in the borehole and periodically actuated to produce acoustic pulses which are applied to the borehole wall. Reflected energy is detected by the transducer between acoustic pulses and converted into signals which are employed to intensity modulate the electron beam of an oscilloscope which is swept across the screen of the oscilloscope once for each rotation of the transducer. In one embodiment, there is also rotated concurrently with the transducer an orienting sensing means which produces an orienting signal each time the transducer is rotated past magnetic north. These signals are employed to initiate the sweep of the electron beam of the cathode-ray tube of the oscilloscope. Successive traces are photographed for the production of a two-dimensional flat record of the inside surface of the borehole wall. Since all of the traces begin with the same orientation, i.e., magnetic north, features such as dips and fractures may be readily oriented.

In one embodiment of the above-identified system, the magnetic north sensing device may comprise a fluxgate magnetometer or Hall-effect device rotated about a fixed axis parallel to the tool axis. The device thus senses the earth's magnetic field perpendicular to the axis of the tool and consequently perpendicular to the axis of the borehole. Rotation of the magnetic north sensing device in most wells results in the production of an alternating voltage from which the orienting signal, indicative of true magnetic north, is derived.

However, in wells deviated in certain directions, difficulty has occurred in obtaining a true magnetic north indication. For example, in the area of Dallas, Tex., the lines of force of the earth's magnetic field extend to the earth at an angle of about 70° to the horizontal. If the borehole is deviated in a direction which extends along these lines, the magnetic sensing device will be rotated in a plane perpendicular to the earth's magnetic field. The voltage generated thus will be at a zero or D-C level whereby it is difficult, or impossible, to derive a signal correctly indicative of a known direction as the orientation sensing device is rotated.

SUMMARY OF THE INVENTION

In accordance with the present invention there is provided a novel orientation sensing system for obtaining a true indication of magnetic north in deviated wells. The orientation sensing system is employed in conjunction with a direcional exploratory sensing means, the latter of which is cyclically rotated about an axis parallel to the longitudinally axis of the tool for carrying out sensing operations in the borehole through 360° for logging for parameters of interest dependent upon the character of the surrounding environment. The orienting sensing system includes a rotatable means which is rotated about an axis maintained in a predetermined direction in the borehole. Means coupled to the orienting sensing means produces a first function dependent upon the angular displacement of a known point on said tool from a known geographic orientation. Means is additionally provided for employing this function to produce an orienting signal each time the exploratory sensing means is rotated to a predetermined geographical orientation.

In the embodiment disclosed, the exploratory sensing means comprises a rotatable assembly having an acoustic transmitting and receiving means. Means coupled between the assembly and the orientation sensing means employs the first function for production a second function dependent upon the angle formed as the transmitting and receiving means rotates between a second known point on the tool and the predetermined geographic orientation. This second function is employed to produce the orienting signal each time the transmitting and receiving means is rotated to the predetermined geographic orientation.

In a further aspect of the present invention, the orienting sensing means may comprise a magnetic north sensing means or a gyrocompass. In either embodiment, means is provided for producing an amplitude function dependent upon the time required for the transmitting and receiving means to rotate 360° during each cycle beginning at the second known point on the borehole tool. The product is formed between the first function and the amplitude function to form the second function.

In the embodiment disclosed, the amplitude function is representative of the peak amplitude obtained by a sawtooth wave generated during each cycle and which begins each time when the transmitting and receiving means is rotated past the second point. In addition, the second function and the sawtooth wave are applied to a coincidence circuit to produce the orienting signal when the amplitude of the sawtooth wave coincides with the amplitude of the second function.

BRIEF DESCRIPTION OF THE DRAWINGS

FIGURE 3 illustrates waveforms useful in understanding the embodiment of FIGURE 2;

FIGURE 4 illustrates a position diagram useful in understanding the present invention;

DESCRIPTION OF WELL LOGGING SYSTEM

Figure 1:
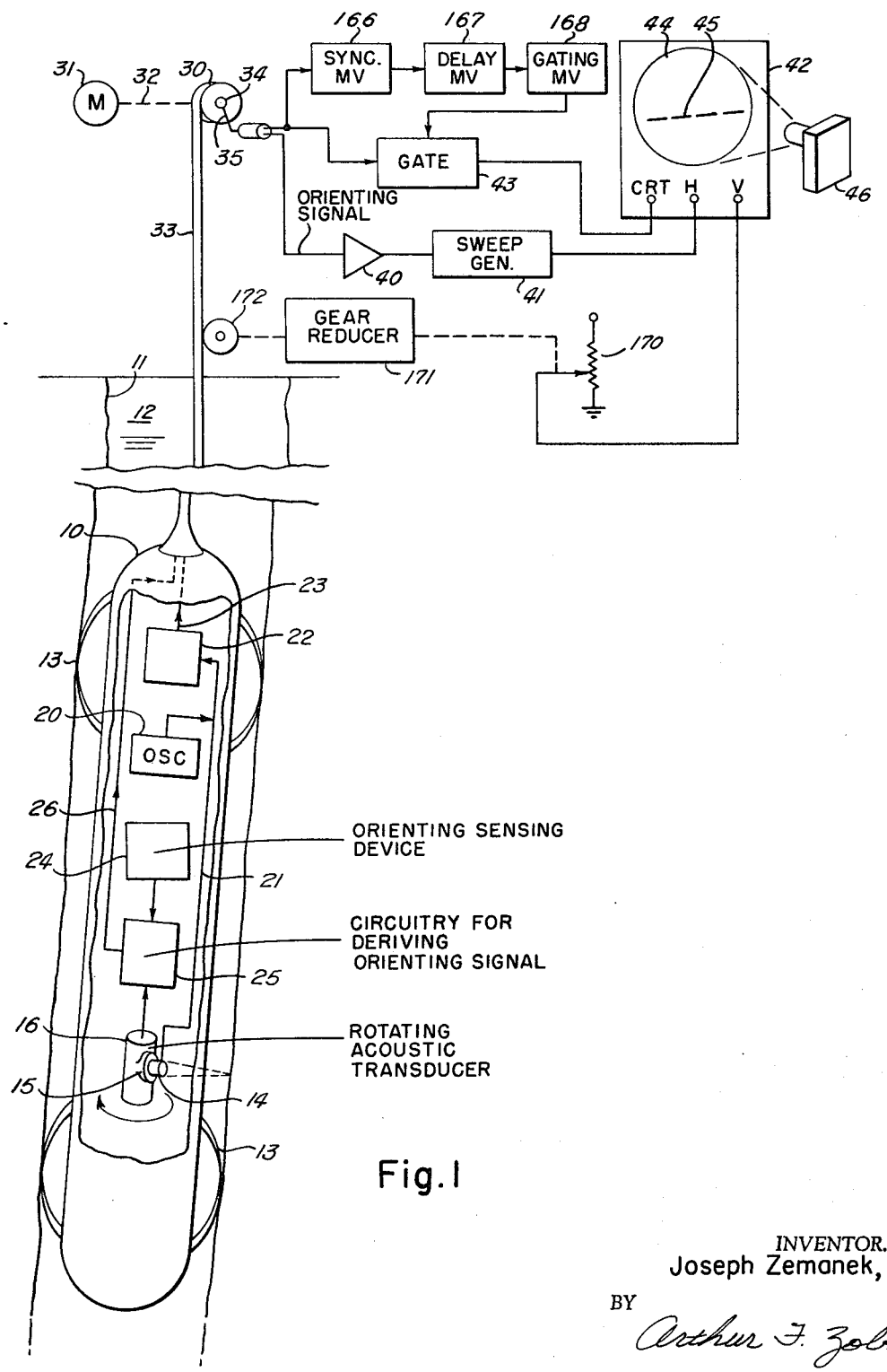
FIGURE 1 illustrates a borehole system in which the present invention may be employed.

Referring now to FIGURE 1, there will be described briefly the borehole system in which the present invention may be employed. This system comprises a borehole tool 10 shown located within a deviated hole 11 filled with fluid illustrated at 12. Centralizers 13, shown only in FIGURE 1, are employed to centralize the tool 10 within the borehole 11. The tool 10 has a directional acoustic transducer 14 which acts as a transmitter and receiver of acoustic energy. The transducer 14 is supported on transducer mount 15 and rotated by sleeve 16 through 360° at a rate of about 180 revolutions per minute in order to scan the borehole wall during logging operations. During each 360° cycle, the transducer 14 is pulsed periodically at a rate of about 2,000 pulses per second for the application of acoustic pulses to the borehole wall. Oscillator 20, which is coupled to the transducer 14 by way of conductor 21 and slip rings (not shown), periodically actuates the transducer for the production of acoustic pulses. Between transmitted acoustic pulses, reflected energy is detected by the transducer 14 and applied to the surface by way of conductor 21, gating and amplifying circuitry 22, and cable conductor 23. Sync pulses are obtained from the transducer 14, when it is actuated, and also are applied to the conductor 23.

Located within the tool 10 is an orienting sensing device 24 which periodically senses direction as the transducer 14 is rotated. Coupled between the orienting sensing device 24 and the sleeve 16 is circuitry 25 which is employed to produce an orienting signal each time the transducer 14 passes magnetic north. The orienting signals produced by circuitry 25 are transmitted to the surface by way of cable conductor 26.

During logging operations, drum 30, driven by motor 31 and connection 32, winds and unwinds the supporting cable 33 to move the tool 10 continuously through the borehole. At the surface, the various pulses and signals are taken from the cable conductors by way of slip rings and brushes illustrated, respectively, at 34 and 35.

The orienting signals are amplified by amplifier 40 and applied to trigger a sawtooth wave sweep generator 41, the output of which is applied to the horizontal deflection plate of an oscilloscope 42. These orienting signals thus initiate the sweep of the electron beam of the cathode-ray tube of the oscilloscope. The received signals, representative of reflected acoustic energy detected, are applied by way of gate 43 to the cathode of the cathode-ray tube of the oscilloscope to intensity modulate the electron beam whereby visible indications may be produced on the face of the scope each time the transducer 14 receives an acoustic echo. Thus, during each rotation cycle of the transducer 14, there is produced across the screen 44 of the oscilloscope 42 an illuminating trace illustrated at 45 indicative of the character of the borehole wall. Successive traces are stepped vertically and photographed by a camera 46 for the production of a two-dimensional print or display of successive traces, which display represents a folded-out section of the inside of the borehole wall.

DETAILED DESCRIPTION OF THE PRESENT INVENTION

In accordance with the present invention, the orienting sensing device 24 has a rotating axis which is maintained in a given direction in the borehole regardless of the deviation of the borehole whereby the output of the device correctly indicates a known geographic orientation. Reference signals are generated each time the rotating component of the device 24 and the sleeve 16 rotate past two known points on the borehole tool. The circuitry 25 takes these signals, as well as the output of the orienting sensing device 24, and produces an orienting signal each time the transducer 14 rotates past magnetic north.

Figure 2:
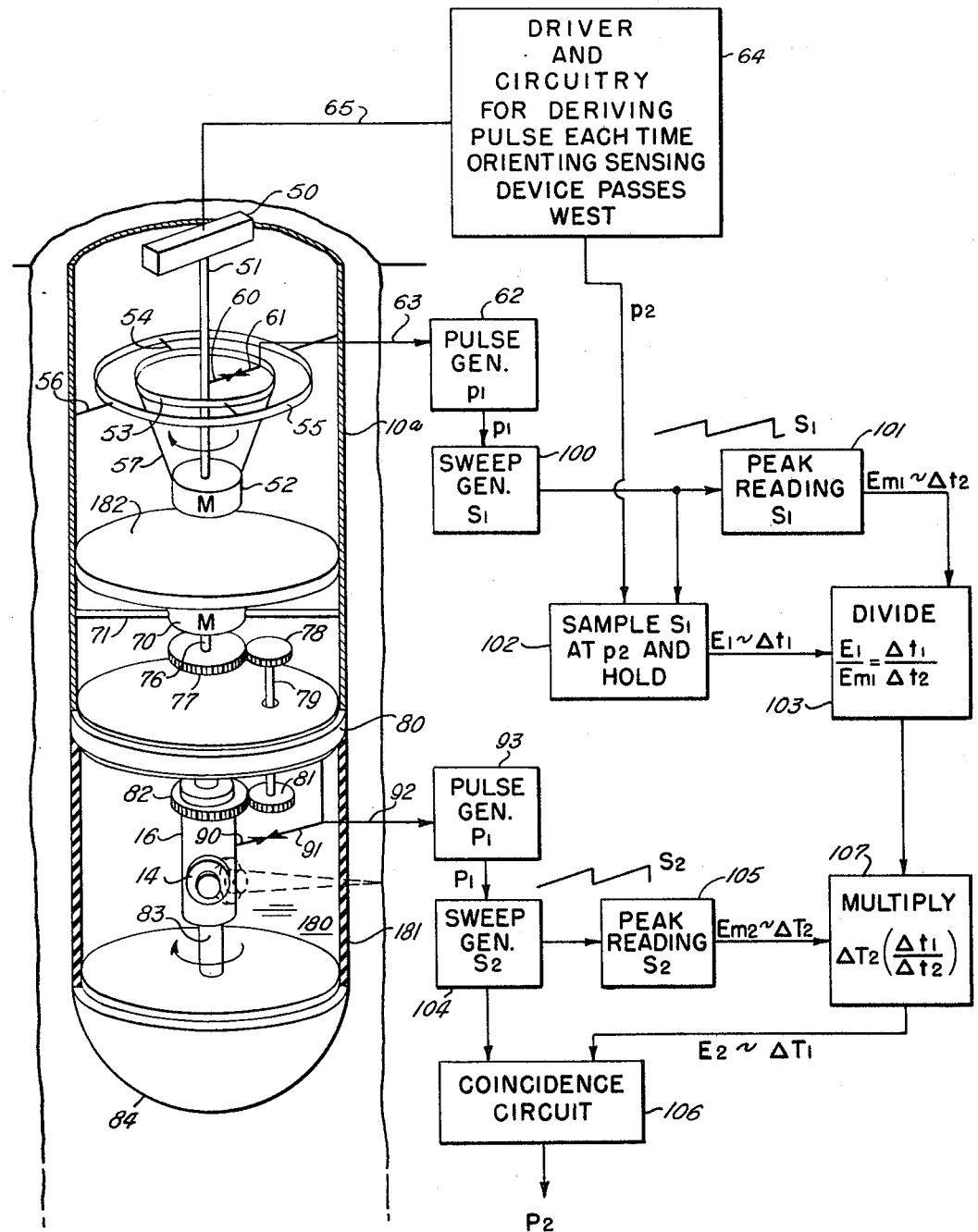
FIGURE 2 illustrates one embodiment of the present invention in block diagram.

The orienting sensing device 24 may be a magnetic north sensing device or a gyrocompass. The former device is disclosed in connection with FIGURE 2 which illustrates in block diagram the circuitry and system of one embodiment of the present invention. Referring to FIGURE 2, the orienting sensing device may comprise a Hall-effect device 50 rotated clockwise by shaft 51 and motor 52. The rate of rotation may be of the order of 200 r.p.m. Motor 52 is supported by a gimbal arrangement whereby its weight will maintain the shaft 51 in a vertical direction regardless of the deviation of the borehole. Thus, a true indication of magnetic north will be obtained.

As illustrated, the gimbal arrangement comprises an inner ring 53 supported by supports 54 whereby it can pivot or turn on an axis through its diameter. Supports 54 in turn are rigidly coupled to a second ring 55 which is supported by supports 56 whereby it may turn or pivot about an axis through its diameter at right angles to the axis defined by supports 54. Supports 56 in turn are rigidly secured to the borehole tool wall 10a. Motor 52 is secured to ring 53 by supports 57.

Secured to shaft 51 and to ring 53 are two terminal members 60 and 61, respectively, which contact each other once for each rotational cycle of the magnetic north sensing device 50 and hence shaft 51. In the embodiment shown, members 60 and 61 contact each other at a point extending along the line defined by supports 56. Pulse generator 62 is coupled to member 61 by conductor 63 and produces a pulse $p_1$ each time contact is made between members 60 and 61. Circuitry 64 is coupled to the magnetic sensing device 50 by way of conductor 65 and produces a pulse $p_2$ each time the device 50 is oriented in a known direction. For reasons of convenience this direction may be the westerly direction. Suitable circuitry for producing pulse $p_2$ is described in the above-mentioned U.S. patent.

Motor 70 rigidly secured by supports 71 to the tool wall 10a drives the sleeve 16 at an angular velocity independent of the angular velocity of the sensing device 50. Connection between the motor 70 and the sleeve 16 is by way of mechanical linkages, and rotation of the sleeve 16 also is in a clockwise direction. The mechanical linkages consist of shaft 76, gears 77 and 78, shaft 79 extending through support member 80, and gears 81 and 82, the latter gear of which is secured to sleeve 16. Sleeve 16 in turn rotates about rod 83 coupled between member 80 and end member 84. Secured to sleeve 16 and to member 80 are terminal member 90 and 91, respectively, which contact each other upon each rotational cycle of the sleeve 16. Coupled to member 91 by way of conductor 92 is a pulse generator 93 which generates a pulse $P_1$ when contact is made between member 90 and 91 during each cycle.

In the embodiment shown, terminal 91 is aligned in the same direction as terminal 61. Moreover, the terminal 60 and the longitudinal axis of the magnetic north sensing device 50 are aligned in the same direction whereby terminal 60 and the longitudinal axis of device 50 face the westerly direction at the same time. In addition, the transducer 14 is angularly displaced 90° clockwise from terminal 90 whereby transducer 14 faces magnetic north when the terminal 90 is pointing in the westerly direction.

Referring to FIGURES 3A and 3C and to FIGURE 4, the pulses $p_1$ and $p_2$ and $P_1$ are illustrated in more detail. The pulse $P_2$ is an orienting signal derived, in accordance with the present invention, each time the terminal 90 rotates to the westerly direction. Since the transducer 14 is angularly displaced 90° clockwise from the terminal 90, pulse $P_2$ will be generated when the transducer is rotated past magnetic north.

As illustrated, pulses $p_1$ and $P_1$ may not occur at the same time since motors 52 and 70 may be rotating at different speeds. These pulses however will occur at known and fixed positions as indicated above. Thus, since the direction at which $p_2$ occurs is known, one can employ these three pulses to determine the time of occurence of $P_2$. For example, $\Delta t_1$ is the time required for the magnetic sensing device 50 to rotate from the direction of terminal 61 to the westerly direction, while $\Delta t_2$ is the time duration of one cycle of rotation of the magnetic sensing device 50. The term $\Delta T_1$ is the time required for the terminal 90 on the sleeve 16 to rotate from terminal 91 to the westerly direction, and $\Delta T_2$ is the time duration of one cycle of rotation of transducer 14. While the times $\Delta t_2$ and $\Delta T_1$ are not equal, the corresponding angles are equal, and the following relationship is valid:

$$\Delta t_1/\Delta t_2 = \Delta T_1/\Delta T_2 \quad (1)$$

The above equation can be solved for $\Delta T_1$:

$$\Delta T_1 = \Delta T_2(\Delta t_1/\Delta t_2) \quad (2)$$

The term $\Delta T_1$ then can be employed to determine the time of occurrence of $P_2$ and hence the time when the transducer 14 faces magnetic north. The system employed for generating $P_2$ will be described referring to FIGURES 2 and 3. The output pulse $p_1$ of pulse generator 62 is applied to a sweep generator 100 to generate a sawtooth wave $S_1$. This sawtooth wave is applied to peak reading circuit 101 and to sample and hold circuit 102. Circuit 101 produces a D-C voltage $Em_1$ which is representative of the peak amplitude attained by sawtooth wave $S_1$ and hence is proportional to $\Delta t_2$. The output pulse $p_2$ from circuit 64 is applied to sample and hold circuit 102 whereby this circuit samples the sawtooth wave $S_1$ at the time of occurrence of $p_2$ and produces a D-C voltage $E_1$ which is representative of the sawtooth wave at the time of $p_2$. Hence, $E_1$ is proportional to $\Delta t_1$. The voltage outputs $Em_1$ and $E_1$ are applied to divide circuit 103 for the production of a ratio $E_1/Em_1$ which is proportional to the ratio of $\Delta t_1/\Delta t_2$.

The output pulse $P_1$ of pulse generator 93 is applied to a second sweep generator 104 for the production of a second sawtooth wave $S_2$. This sawtooth wave is applied to a second peak reading circuit 105 and to a coincidence circuit 106. The peak reading circuit 105 produces a D-C voltage $Em_2$ which is representative of the peak value of the amplitude attained by the sawtooth wave $S_2$. $Em_2$ hence is proportional to $\Delta T_2$. This voltage is applied to multiply circuit 107 which takes the output from divide circuit 103 and forms the product $Em_2(E_1/Em_1)$ which is proportional to the product $\Delta T_2(\Delta t_1/\Delta t_2)$. The output of multiply circuit 107, which is a D-C voltage represented by $E_2$, thus is proportional to $\Delta T_1$. This output is applied to the coincidence circuit 106 for the production of the output pulse $P_2$ when the amplitude of sawtooth wave $S_2$ coincides with the amplitude of voltage $E_2$. As indicated above, $P_2$ occurs when the transducers 14 faces magnetic north.

Although the switches formed by terminals 60–61 and 90–91 were described as mechanical in nature, it is to be understood that other types of switches could be employed. For example, magnetic markers could be impressed on shaft 51 and sleeve 16 and electrical sensing coils located adjacent to shaft 51 and sleeve 16 at known positions. These coils would detect the change in the magnetic field occurring as the markers are rotated past the coils respectively for the production of voltage pulses in order to produce the pulses $p_1$ and $P_1$. In this embodiment, it is to be understood that the magnetic marker on shaft 51 would be located at a position where it would not affect the sensitivity of the magnetic north sensing device 50.

Figure 5:
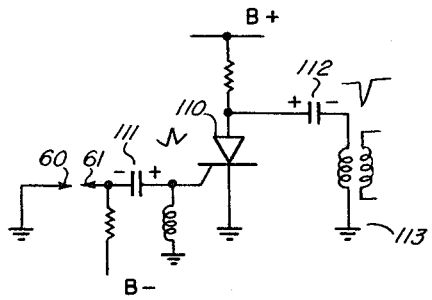
FIGURES 5–9 illustrate in detail circuitry which may be employed for the block diagram components shown in FIGURE 2.

There now will be described in detail circuitry which may be employed for some of the block diagram components shown in FIGURE 2. FIGURE 5 illustrates a pulse generator suitable for use as the pulse generators 62 and 93. It will be described in relation to generator 62. This generator consists of a normally OFF, silicon-controlled rectifier 110 and normally charged capacitors 111 and 112. When terminals 60 and 61 contact each other, capacitor 111 discharges to produce a positive potential on its side adjacent the silicon-controlled rectifier 110, thereby turning the rectifier ON momentarily and allowing capacitor 112 to discharge. This short discharge of the capacitor 112 produces the pulse $p_1$ which is applied through transformer 113 to the sweep generator 100.

Figure 6:
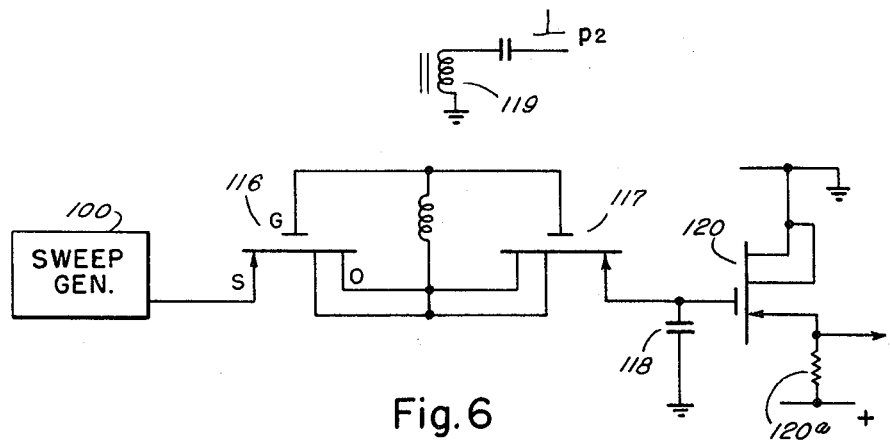

Referring to FIGURE 6, the sample and hold circuit 102 may consist of two series-connected, P-channel, field-effect transistors 116 and 117 and capacitor 118. The transistors 116 and 117 are connected whereby either one normally will be reversed biased either by the sweep voltage from circuit 100 or the charge on capacitor 118. Thus, normally current does not flow through the transistors 116 and 117. Assuming that capacitor 118 initially is discharged, a positive pulse representative of $p_2$ applied through transformer 119 in a manner to bias the gates of the transistors with a negative polarity will allow current from sweep generator 100 to flow through the field-effect transistors momentarily to charge the capacitor 118 to the amplitude of the sawtooth wave $S_1$ at the time of occurrence of $p_2$ for the production of voltage $E_1$. This charge and hence potential is maintained across capacitor 118 for a period with the aid of high impedance buffer 120 which may be a P-channel, field-effect transistor connected as a source follower. The voltage $E_1$ is taken across resistor 120a and applied to divide circuit 103. In the succeeding cycles of operation, for example, if the sampling pulse $p_2$ occurs earlier and hence the amplitude of the sawtooth wave $S_1$ at the new sampling time is lower in value, capacitor 118 will discharge through transistors 117 and 116 and seek the level of the sawtooth wave amplitude at the new sampling time. Thus, the voltage $E_1$ will properly decrease to a lower value.

Figure 7:
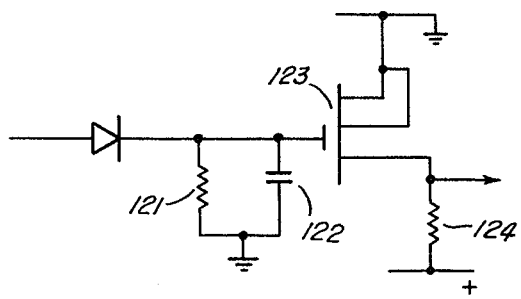

Referring to FIGURE 7, the peak reading circuits 101 and 105 may consist of resistor 121 and capacitor 122 coupled to a high impedance buffer 123 which also may be a P-channel, field-effect transistor connected as an emitter-follower. Capacitor 122 thus charges to the peak value of the sawtooth wave for the production of the output voltage $Em_1$ which is applied from across resistor 124 to the appropriate circuitry.

Figure 8:
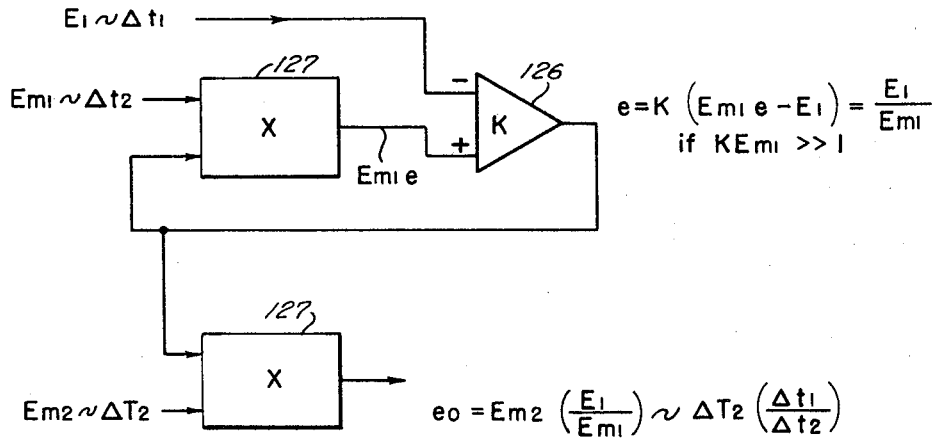

The divide and multiplying circuitry 103 and 107 may be of the type manufactured by General Magnetics, Bloomfield, N.J., Model No. MCM-836-1. Referring to FIGURE 8, this circuitry may consist of a high gain amplifier 126 and multiplying circuitry 127. The voltage $E_1$ is applied to amplifier 126 while the voltage $Em_1$ is applied to multiplying circuitry 127. The output $e$ of the amplifier 126 is equal to $K(Em_1e - E_1)$ which is equal to $E_1/Em_1$. This holds true if $KEm_1$ is much greater than one. The output of the amplifier 126 is applied back to the multiplier 127 to produce the output $Em_1e$ which is applied to the amplifier 126. The output of the amplifier also is applied to the multiplying circuitry 127 which forms the product between the voltage $Em_2$ and the ratio $E_1/Em_1$.

Figure 9:
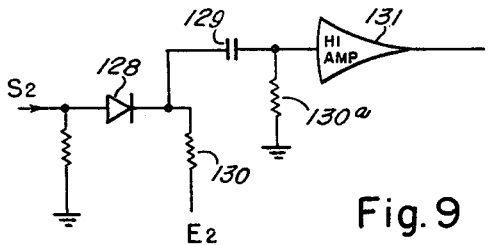

Referring to FIGURE 9, the coincident circuit 106 may consist of a diode 128 having the sawtooth wave $S_2$ applied to its anode and the D-C voltage $E_2$ applied to its cathode by way of resistor 130. When the sawtooth wave $S_2$ increases to the level of $E_2$, capacitor 129 and resistor 130a differentiate the output to produce a sharp peak which then is amplified by the high-gain amplifier 131 for the production of the pulse $P_2$.

Figure 10:
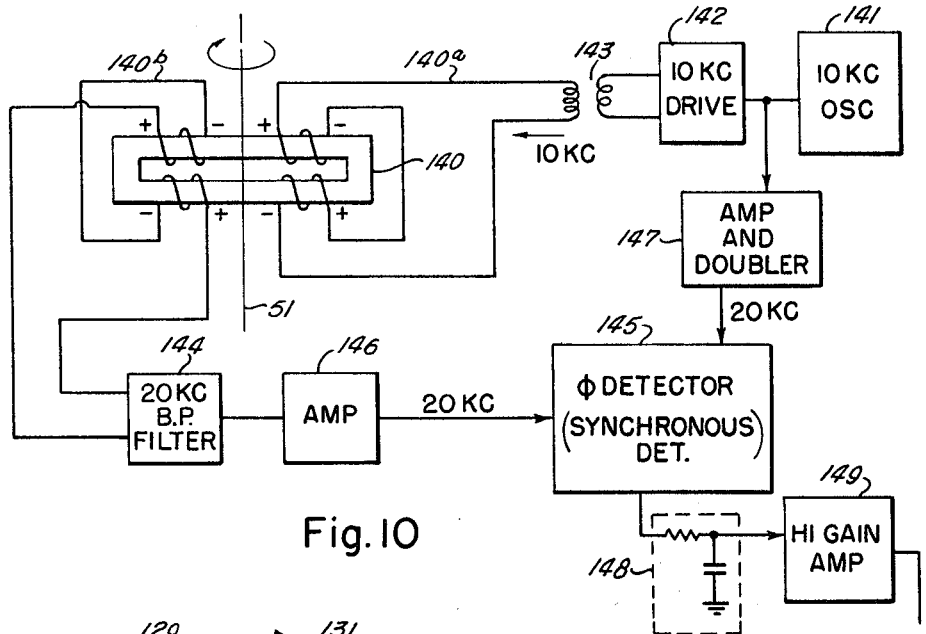
FIGURE 10 illustrates a fluxgate magnetometer system which may be employed in the system of the present invention.

Although the magnetic north sensing device 50 of FIGURE 2 was described as a Hall-effect device, a fluxgate magnetometer, such as the Magnetometer Probe No. 3529A, manufactured by Hewlett Packard Corp., P.O. Box 301, Loveland, Colo., 80537, may be employed instead. A system employing a fluxgate magnetometer is shown in FIGURE 10. The magnetometer consists of a core 140 formed of suitable magnetic material which is rotated by the shaft 51. This core is excited by circuitry comprising a 10-kc. oscillator 141, a driving circuit 142, and a transformer 143 coupled to winding 140a. The output from the winding 140b is applied to a 20-kc. bandpass filter 144, the output of which is coupled to a phase detector 145 by way of amplifier 146. The 10-kc. signal produced from generator 141 is applied to an amplifier and doubler 147 for the production of a 20-kc. signal which then is applied to the phase detector 145 for comparison purposes. The output from the phase detector is integrated by integrator 148 to remove the 20-kc. carrier signal and to produce a sine wave having a maximum positive amplitude when the core 140 is oriented toward the magnetic north and a maximum negative amplitude when oriented toward magnetic south. The output of the integrator 148 drives the high-gain inverter-amplifier 149 to a state of saturation to produce squarewaves whose trailing edges are representative of the westerly direction. The pulses may be differentiated, clipped, and inverted for production of the pulses $P_2$.

Figure 11:
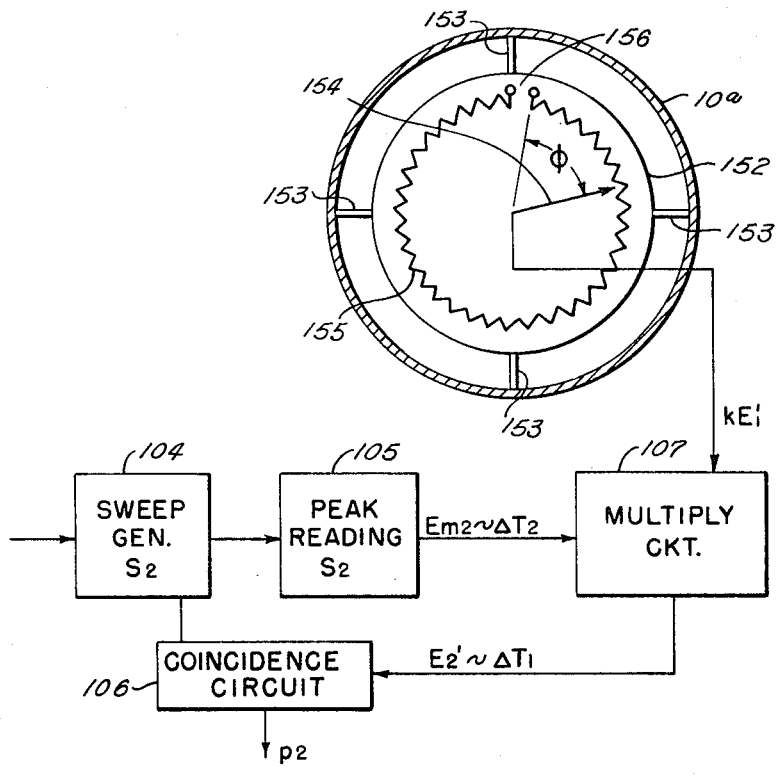
FIGURE 11 illustrates another type of orientation sensing system which may be employed in the system of the present invention.
Figure 12:
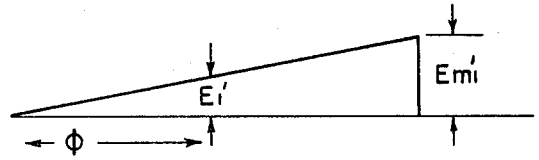
FIGURE 12 illustrates traces useful in understanding the system of FIGURE 11.

As indicated above, a gyrocompass may be employed to sense direction for the prouction of the pulse $P_2$. A suitable gyrocompass may be that identified by Model No. D607, manufactured by Humphrey, Inc., San Diego, Calif. Such a gyrocompass consists of a spinning member supported by gimbals and located within a housing illustrated at 152 in FIGURE 11. It will be employed in combination with transducer 14, sleeve 16, and terminals 90–91 described in connection with FIGURE 2. Housing 152 is rigidly secured to the tool wall 10a by supports 153. Secured to the rotating member is a potentiometer arm 154 which will remain in the same direction as the axis of rotation of the spinning member. A resistance element 155 energized at the terminals 156 by a source (not shown) is secured to the housing 152 and hence will turn as the tool 10 turns in the borehole. The output of the arm 154 thus is a voltage $E_1'$ which represents the angle formed between a known mechanical point on the tool, i.e., the position of the terminals 156, and the direction set by the gyrocompass which may be true north. The mechanical point may be aligned with the position of the terminal 91 which is employed to contact terminal 90 as the sleeve 16 rotates as described above and as disclosed in connection with FIGURE 2. One complete rotation of the tool 10 will result in the production from potentiometer arm 154 of the sawtooth waveform shown in FIGURE 12 while a partial rotation from the known mechanical point aligned with terminal 91 will result in the prouction of the voltage $E_1'$ which is proportional to $\theta$. Thus, the following relationship is valid:

$$\theta/360° = \Delta T_1/\Delta T_2 \sim E_1'/Em_1' \quad (3)$$

The term $\Delta T_1$ may be solved:

$$\Delta T_1 \sim \Delta T_2(E_1'/Em_1') \quad (4)$$

Since $Em_1'$ is a constant, the above equation may be reduced to:

$$\Delta T_1 \sim \Delta T_2(k)E_1' \quad (5)$$

A voltage proportional to $\Delta T_1$ may be obtained in a manner similar to that described above. This voltage may then be employed to obtain $P_2$. For example, referring to FIGURE 11, the output of the potentiometer arm 154 is applied to multiply circuit 107. The pulse $P_1$ triggers sweep generator 104 for the production of a sawtooth wave $S_2$ which is applied to the peak reading circuit 105 for the production of the voltage $Em_2$. The output of multiply circuit thus is $E_2'$ which is proportional to $\Delta T_1$. This output, as well as the output from sweep generator 104, is applied to the coincidence circuit 106 for the production of the pulse $P_2$.

Figure 13:
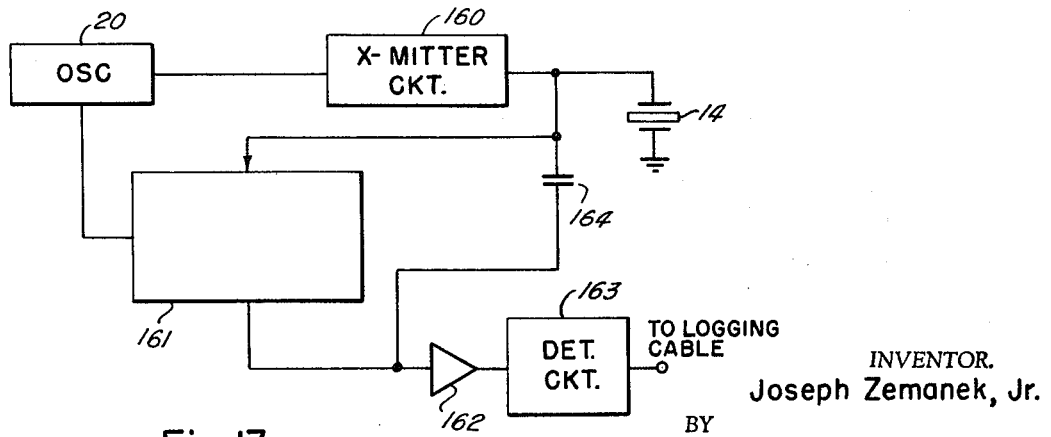
FIGURE 13 illustrates in detail some of the downhole circuitry shown in block form in FIGURE 1.

Referring now to FIGURE 13, there will be described other details of the borehole system. The oscillator 20 triggers a transmitter circuit 160 to excite the transducer 14. The transmitter pulse crossfeed is minimized by the use of a gating circuitry 161 which blocks the crossfeed and amplifies the received signal. The output of circuitry 161 is amplified at 162 and applied to a detector circuit 163 to form the envelope of the reflected signal received.

In order to obtain a sync pulse, the signal produced by the transducer 14, when it fires, is attenuated to a low level by the combination of capacitor 164 and the input impedance of amplifier 162 and then applied to detector 163 where its envelope is formed.

At the surface, the sync pulse is applied to open gate 43 (FIGURE 1). These sync pulses first are applied to sync multivibrator 166. A delay multivibrator 167 is triggered coincidentally by the leading edge of the output of sync multivibrator 166. The trailing edge of the output of multivibrator 167 in turn triggers gating multivibrator 168 for the production of a gating signal which occurs when the receiver signals are expected. This gating signal opens gate 43 to allow the received receiver signals to pass to the oscilloscope 42.

As indicated above, the traces 45 produced are stepped vertically upon each rotation of the transducer 14. The system for accomplishing this function comprises a potentiometer 170, the arm of which is mechanically coupled through gear reducer 171 to reel 172 driven by logging cable 33. As the cable 33 is moved continuously to move the tool 10 through the borehole, the contact of the potentiometer 170 moves across the resistance element, thereby generating a slowly changing sweep voltage which is applied to the vertical deflection plate of the oscilloscope 42. The inclined trace indicates the continuous change in depth of the logging tool. Each trace will begin at a height substantially where the preceding trace terminated.

Referring to FIGURE 2, the rotating transducer 14 is immersed in oil illustrated at 180 which is contained by the rubber boot 181. The disk-shaped element 182 in the borehole tool 10 is employed to seal the orientation sensing device from the borehole pressure and to maintain its environment at atmospheric pressure.

What is claimed is:
1. A borehole logging system comprising:
   a borehole tool for traversing a borehole extending into the formations,
   a sensing assembly including directional exploratory sensing means and first drive means for cyclically rotating said sensing means for carrying out sensing operations in said borehole through 360° for logging for parameters of interest dependent upon the character of the surrounding environment,
   orienting sensing means including a rotatable means located in said tool,
   said orienting sensing means including second drive means for rotating said rotatable means at an angular velocity independent of the angular velocity at which said exploratory sensing means is rotated,
   the axis of rotation of said rotatable means being maintained in a predetermined direction in said borehole,
   means for producing a first function dependent upon the orientation of said tool with respect to a known geographic orientation, means for producing an amplitude function dependent upon the time required for said exploratory sensing means to rotate 360° during each cycle beginning at a predetermined position with respect to said borehole tool, and means for employing said first function and said amplitude function to produce an orienting signal each time said exploratory sensing means is rotated to a predetermined geographic orientation.

2. A borehole logging system comprising:

an elongated borehole tool for traversing a borehole extending into the formations, exploratory sensing means located in said tool for carrying out sensing operations within said borehole for logging for parameters of interest dependent upon the character of the surrounding environment, means for cyclically rotating said exploratory sensing means about a predetermined axis parallel to the longitudinal axis of said tool for carrying out sensing operations in said borehole through 360°, orienting sensing means including rotating means located in said tool, means for maintaining the axis of rotation of said rotating means in a predetermined direction in said borehole, means coupled to said orienting sensing means for producing a first function dependent upon the angular displacement of a known point on said tool from a known geograhpic orientation, and means for employing said function to produce an orienting signal each time said exploratory sensing means is rotated to a predetermined geographic orientation.

3. The system of claim 2 wherein said exploratory sensing means comprises:

acoustic transmitting and receiving means for transmitting acoustic energy to the surrounding environment to be investigated and for detecting reflected acoustic energy.

4. The system of claim 2 comprising:

means for producing a second function dependent upon the time required for said exploratory sensing means to rotate between a second known point on said tool and said predetermined geographic orientation, and means for deriving said orienting signal from said second function.

5. The system of claim 4 wherein said exploratory sensing means comprises:

acoustic transmitting and receiving means for transmitting acoustic energy to the surrounding environment to be investigated and for detecting reflected acoustic energy.

6. The system of claim 4 comprising:

means for producing an amplitude function dependent upon the time required for said exploratoy sensing means to rotate 360° during each cycle beginning at a predetermined position with respect to said borehole tool, and means for combining said first function and said amplitude function to form said second function.

7. The system of claim 6 wherein:

said last-named means forms the product between said first function and said amplitude function to form said second function.

8. A borehole logging system comprising:

an elongated borehole tool for traversing a borehole extending into the formations, an assembly including directional acoustic transmitting and receiving means located in said tool for carrying out sensing operations within said borehole for logging for parameters of interest dependent upon the character of the surrounding environment, means for cyclically rotating said assembly including said acoustic transmitting and receiving means about a predetermined axis parallel to the longitudinal axis of said tool for carrying out sensing operations in said borehole through 360°, orienting sensing means including rotating means located in said tool, means for maintaining the axis of rotation of said rotating means in a predetermined direction in said borehole, means for producing a first function dependent upon the angular displacement between a first known point on said tool and a known geographic orientation, means coupled between said assembly and said orienting sensing means for employing said first function for producing a second function dependent upon the angle formed as said transmitting and receiving means rotates between a second known point on said tool and a predetermined geographic orientation, and means for employing said second function to produce an orienting signal each time said transmitting and receiving means is rotated to said predetermined geographic orientation.

9. The system of claim 8 comprising:

means for generating a sawtooth wave during each cycle, said sawtooth wave beginning each time said transmitting and receiving means is rotated past said second point, a coincidence circuit, and means for applying said second function and said sawtooth wave to said coincidence circuit to produce said orienting signal when the amplitude of said sawtooth wave coincides with the amplitude of said second function.

10. The system of claim 8 wherein said orienting sensing means including said rotating means comprises magnetic north sensing means, said system including:

means for maintaining the axis of rotation of said magnetic north sensing means substantially vertical, means for rotating said magnetic north sensing means at an angular velocity independent of the angular velocity at which said assembly is rotated, said first function produced being identified as $E_1$, first generating means for generating a first amplitude function $Em_1$ dependent upon the time required for said magnetic north sensing means to rotate 360° during each cycle beginning at said first known point, second generating means for generating a second amplitude function $Em_2$ dependent upon the time required for said transmitting and receiving means to rotate 360° during each cycle beginning at said second known point, and means for combining said functions in the following manner to produce said second function $E_2$:

$$E_2 = Em_2(E_1/Em_1)$$

11. The system of claim 10 comprising:

means for periodically producing a first timing signal each time said magnetic north sensing means rotates past said first known point on said tool, means for periodically generating a second timing signal each time said magnetic north sensing means rotates to said known geographic orientation, means for periodically generating a first sawtooth wave beginning at the time of occurrence of said first timing signal, means for sampling the amplitude of said first sawtooth wave at the time of occurrence of said second timing signal to produce said first function, means for periodically producing a timing signal each time said transmitting and receiving means rotates past said second known point on said tool, means for periodically producing a second sawtooth wave beginning at the time of occurrence of said last-named timing signal, and means for sampling the amplitude of said second sawtooth wave when said transmitting and receiving means rotates to said predetermined geographic orientation to generate said second function.

12. The system of claim 11 comprising:
a coincidence circuit, and
means for applying said second function and said sawtooth wave to said coincidence circuit to produce said orienting signal when the amplitude of said second sawtooth wave coincides with the amplitude of said second function.

13. The system of claim 8 wherein:
said orienting sensing means is adapted to be maintained in said known greographic orientation,
said first function produced being identified as $E_1$, said system including:
  generating means for generating an amplitude function $Em_2$ dependent upon the time required for said transmitting and receiving means to rotate 360° during each cycle beginning at said second known point, and
  means for combining said functions in the following manner to produce said second function $E_2$:

$$E_2 = (Em_2)(E_1)$$

14. The system of claim 13 comprising:
means for periodically producing a timing signal each time said transmitting and receiving means rotates past said second known point on said tool,
means for periodically producing a sawtooth wave beginning at the time of occurrence of said timing signal, and
means for sampling the amplitude of said sawtooth wave when said transmitting and receiving means rotates to said predetermined geographic orientation to generate said second function.

15. The system of claim 14 comprising:
a coincidence circuit, and
means for applying said second function and said sawtooth wave to said coincidence circuit to produce said orienting signal when the amplitude of said sawtooth wave coincides with the amplitude of said second function.

References Cited

UNITED STATES PATENTS 3,369,626   2/1968   Zemanek _____ 181—.5

RICHARD A. FARLEY, Primary Examiner

C. E. WANDS, Assistant Examiner

U.S. Cl. X.R.

340—18

PO-1050 (5/69)

BEST AVAILABLE COPY

UNITED STATES PATENT OFFICE
CERTIFICATE OF CORRECTION

Case 7079

Patent No. 3,478,839     Dated November 18, 1969

Inventor(s) Joseph Zemanek, Jr.

It is certified that error appears in the above-identified patent and that said Letters Patent are hereby corrected as shown below:

Column 2, line 21, "longitudinally" should read --longitudinal--;
           line 33, "geographical" should read --geographic--;
           line 38, "production" should read --producing--.

Column 4, line 66, "member" should read --members--;
           line 70, "member" should read --members--.

Column 5, line 16, "fetrent" should read --ferent--;
           line 27, "$\Delta t_2$" should read --$\Delta t_1$--;
           line 70, "transducers" should read --transducer--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents